US006896632B2

(12) United States Patent
Redmond

(10) Patent No.: US 6,896,632 B2
(45) Date of Patent: May 24, 2005

(54) BELT DRIVE CANTILEVER TENSIONER

(75) Inventor: John D. Redmond, Littleton, CO (US)

(73) Assignee: The Gates Corporation, Denver, CO (US)

( * ) Notice: Subject to any disclaimer, the term of this patent is extended or adjusted under 35 U.S.C. 154(b) by 111 days.

(21) Appl. No.: 10/359,898

(22) Filed: Feb. 6, 2003

(65) Prior Publication Data

US 2003/0158007 A1 Aug. 21, 2003

Related U.S. Application Data

(60) Provisional application No. 60/358,884, filed on Feb. 21, 2002.

(51) Int. Cl.$^7$ ................................................ F16H 7/08
(52) U.S. Cl. ........................ 474/133; 101/135; 101/117
(58) Field of Search ................................ 474/133, 135, 474/136, 138, 112, 117–118; 280/124.134, 124.143, 124.122, 124.144

(56) References Cited

U.S. PATENT DOCUMENTS

| | | | |
|---|---|---|---|
| 4,108,013 A | * 8/1978 | Sragal | 474/135 |
| 4,312,267 A | * 1/1982 | Shenberger | 474/133 |
| 4,500,303 A | * 2/1985 | Sermersheim et al. | 474/112 |
| 4,530,682 A | * 7/1985 | Gruber et al. | 474/133 |
| 4,816,012 A | 3/1989 | Bytzek | 474/135 |
| 4,824,421 A | 4/1989 | Komorowski | 474/135 |
| 4,950,398 A | 8/1990 | Wiegand et al. | 210/232 |
| 4,957,471 A | * 9/1990 | St. John | 474/133 |
| 5,000,477 A | * 3/1991 | Minakawa et al. | 280/124.143 |
| 5,340,146 A | * 8/1994 | Kato | 280/124.143 |
| 5,489,243 A | * 2/1996 | Watanabe | 474/135 |
| 6,224,028 B1 | 5/2001 | Tanaka et al. | 248/200 |

FOREIGN PATENT DOCUMENTS

DE      (3812375) A1 * 10/1989 ................. 474/133

* cited by examiner

*Primary Examiner*—Marcus Charles
(74) *Attorney, Agent, or Firm*—J. A. Thurnau, Esq.; C. H. Castleman, Esq.; S. G. Austin, Esq.

(57) ABSTRACT

A belt drive cantilever tensioner. The tensioner is particularly suited to belt drive systems having a high belt tension. The tensioner comprises a pulley journaled to a cantilever arm. The cantilever arm is pivotably attached to a mounting surface by a fastener at a pivot. The cantilever arm further comprises a hole disposed radially from the pivot for containing an embedded resilient member. A second fastener extends through the resilient member fixing it in a position relative to the first fastener. A load applied to the pulley causes the arm to pivot thereby causing a lever action to exert a force upon the resilient member. The resilient member has a limit of movement as well as an asymmetric force characteristic which increases in proportion to an arm rotation.

4 Claims, 1 Drawing Sheet

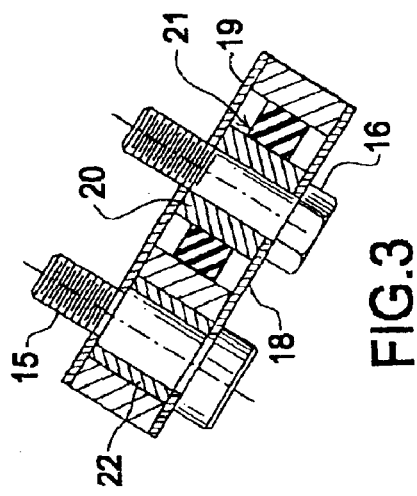
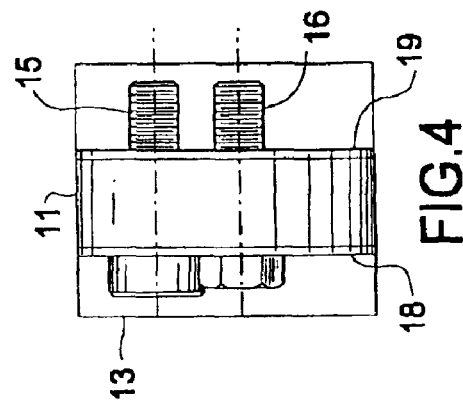
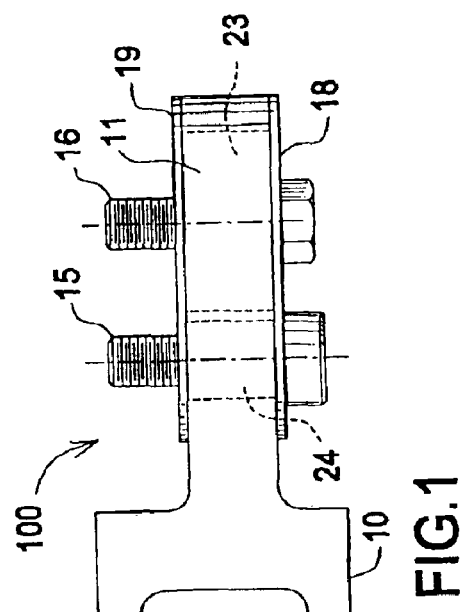
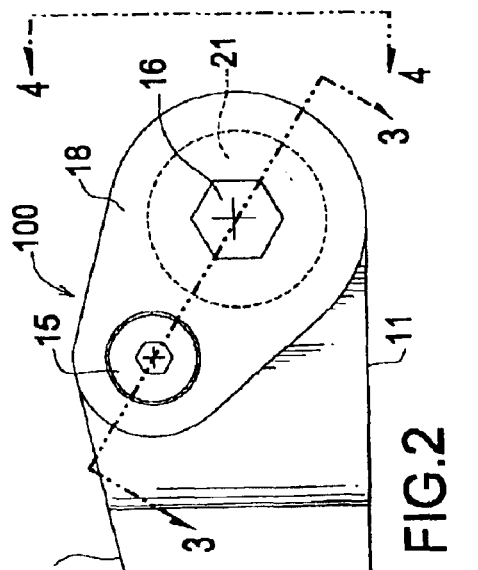
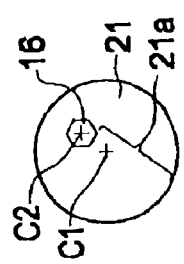
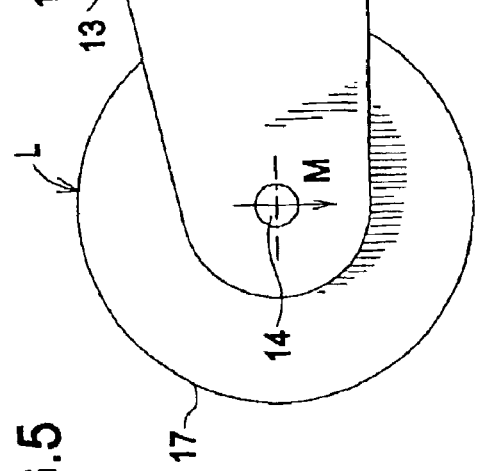

BELT DRIVE CANTILEVER TENSIONER

REFERENCE TO RELATED APPLICATIONS

This non-provisional patent application claims priority from provisional U.S. patent application Ser. No. 60/358,884 filed Feb. 21, 2002.

FIELD OF THE INVENTION

The invention relates to a belt drive cantilever tensioner and more particularly to a belt drive cantilever tensioner having an embedded elastomeric member for modulating an arm movement.

BACKGROUND OF THE INVENTION

Prior art cantilever shafts having a pulley generally comprise an arm that is fixedly attached to a mounting surface. The arm is not moveable with respect to a belt or chain.

Representative of the art is U.S. Pat. No. 6,224,028 B1 (2001) to Tanaka et al. which discloses a cantilever shaft assembly for rotating member comprising a steel shaft and a core shaft made of synthetic resin. A sprocket is supported to the free end of the cantilever shaft assembly.

Tensioners are also known that comprise an arm connected to a coil spring. The spring imparts a force on the arm thereby causing a belt tension. Such tensioners impart a relatively low force on a belt and have a relatively large range of movement.

The prior art either comprises a cantilever arm which relies upon an arrangement wherein the spring imparts a belt load, or a fixedly mounted cantilever arm having no spring rate to impart a belt tension. Further, the prior art tensioners allow a relatively wide range of movement, thereby causing a range of belt tensions.

What is needed is a cantilever tensioner having a high load capability. What is needed is a cantilever tensioner having a cantilever arm with a small range of movement for maintaining a belt tension. What is needed is a cantilever tensioner having an elastomeric member embedded in the cantilever arm for modulating a cantilever arm movement. The present invention meets these needs.

SUMMARY OF THE INVENTION

The primary aspect of the invention is to provide a cantilever tensioner having a high load capability.

Another aspect of the invention is to provide a cantilever tensioner having a cantilever arm with a small range of movement for maintaining a belt tension.

Another aspect is to provide a cantilever tensioner having an elastomeric member embedded in the cantilever arm for modulating a cantilever arm movement.

Other aspects of the invention will be pointed out or made obvious by the following description of the invention and the accompanying drawings.

The invention comprises a belt drive cantilever tensioner. The tensioner is particularly suited to belt drive systems requiring a high belt tension. The tensioner comprises a pulley journaled to a cantilever arm. The cantilever arm is pivotably attached to a mounting surface by a fastener at a pivot. The cantilever arm further comprises a hole disposed radially from the pivot for containing an embedded resilient member. A second fastener extends through the resilient member fixing it in a position relative to the first fastener. A load applied to the pulley causes the arm to pivot thereby causing a lever action to exert a force upon the resilient member. The resilient member has a limit of movement as well as an asymmetric force characteristic which increases in proportion to an arm rotation.

BRIEF DESCRIPTION OF THE DRAWINGS

FIG. 1 is a top plan view of the inventive tensioner.

FIG. 2 is a side elevation view of the inventive tensioner.

FIG. 3 is a cross-sectional view at line 3—3 in FIG. 2.

FIG. 4 is a side elevation view at line 4—4 in FIG. 2.

FIG. 5 is a detail of an alternate embodiment.

DETAILED DESCRIPTION OF THE INVENTION

FIG. 1 is a top plan view of the inventive tensioner. Tensioner 100 comprises body 10. Body 10 comprises mounting portion 11 and pulley arm 12 and pulley arm 13. The body may comprise any suitable metallic substance, including aluminum and its equivalents.

Pulley 17 is rotatably journaled to arm 12 and arm 13 by shaft 14. Plate 18 and plate 19 each engage a side surface of mounting portion 11. Threaded fastener 15 and threaded fastener 16 are used to mount the tensioner to a mounting surface, such as an engine (not shown). Fastener 15 and 16 are disposed in holes 24 and 23 respectively.

FIG. 2 is a side elevation view of the inventive tensioner. Plate 18 substantially covers a portion of hole 23 and hole 24. Fastener 15 and 16 each protrude through plate 18 and plate 19 (not shown). Fastener 15 and 16 each affix plate 18 to a side of mounting portion 11. A belt load L bears upon pulley 17 when in use.

FIG. 3 is a cross-sectional view at line 3—3 in FIG. 2. Spacer 20 is disposed between plate 18 and plate 19 in order to establish a predetermined spacing between plate 18 and plate 19. The predetermined spacing allows body 10 to pivot about fastener 15.

Elastomeric member 21 is disposed about spacer 20 in hole 23. Elastomeric member 21 is substantially cylindrical in shape in order to cooperatively engage hole 21. Elastomeric member 21 has a diameter that is slightly larger than a diameter of hole 23 so as to create a compression on elastomeric member 21 when it is installed in hole 23.

Bearing 22 is disposed in hole 24 about fastener 15. Bearing 22 may comprise bronze, PTFE, phenolics or equivalents in order to facilitate a rotation of body 10 about fastener 15.

In operation a load L is applied to pulley 17. This subjects body 10 to a moment arm. Fastener 15 and bearing 22 comprise a pivot point about which the body 10 rotates. One skilled in the art can appreciate that fastener 16 and elastomeric member 21 only allow body 10 to rotate a predetermined amount about fastener 15. Due to the presence of spacer 20, plate 18 and plate 19 do not hinder a movement of body 10. Plate 18 and plate 19 contain elastomeric body 21 in mounting portion 11.

Elastomeric body 21 comprises a compression modulus or spring rate. The material of which elastomeric body is comprised is selected for a proper compression modulus or spring rate. As body 10 is loaded, elastomeric member 21 is compressed by rotation of body 10. A predetermined amount of compression of member 21 results in a preload being imparted to a drive belt (not shown). The amount of compression may also be adjusted by changing a diameter of spacer 20, thereby increasing or decreasing a thickness of elastomeric body 21.

During an engine load change, such as an acceleration or deceleration, a load L may significantly increase, creating a shock load. An increase in load L causes a further compression of member 21 and a further rotation of body 10. Rotation of body 10 continues until a maximum position is reached at which point no further rotation occurs. Due to the resilient nature of elastomeric member 21, such a movement of body 10 is sufficient to slowly relieve a shock load that may otherwise damage a drive belt during an engine load change.

Elastomeric body 21 may comprise any natural or synthetic rubber, or combination thereof, and equivalents. For example, and not as limitation, elastomeric body 21 may comprise Vamac 5™, Vamac 119™, and Vamac 120™ each having a Shore A durometer of 60, 79 and 81, respectively. One can appreciate that the appropriate durometer is chosen to produce a desired spring rate.

For illustrative purposes a typical load L may be in the range of 1500 to 2000 pounds. The spring rate of the elastomeric body is selected to give a body movement M at the pulley in the range of 0.07" to 0.12". In the case of a pulley shaft center (14) to pivot center (15) distance of 3.75" and given a movement of 0.10", this gives an arcuate movement of the body 10 of approximately 1.5°. One can see that when subjected to a relatively high load the tensioner pulley moves a small amount. This allows the tensioner to maintain a predetermined preload in a drive belt during normal operation while having a sufficient minimal additional movement range to alleviate a shock load during abrupt engine load changes.

FIG. 4 is a side elevation view at line 4—4 in FIG. 2.

FIG. 5 is a detail of an alternate embodiment. Elastomeric body 21 is eccentrically shaped so that a center C2 of bolt 16 is offset from a center C1 of elastomeric member 21 and thereby offset from a center of hole 23. A location of C2 with respect to C1 can be adjusted as required. This results in portion 21a having an adjustable thickness as compared to the embodiment shown in FIG. 2. This in turn can be used to vary a spring rate as may be required by a user.

Although a single form of the invention has been described herein, it will be obvious to those skilled in the art that variations may be made in the construction and relation of parts without departing from the spirit and scope of the invention described herein.

I claim:

1. A cantilever tensioner comprising:

an arm;

a pulley journaled to the arm;

the arm having a pivot comprising a fastener for mounting the tensioner to a mounting surface, the pivot disposed a distance from the pulley;

the arm having a hole;

an elastomeric member disposed in the hole; and a fastener engaged through the elastomeric member for mounting the tensioner to a mounting surface.

2. The cantilever tensioner as in claim 1, wherein the elastomeric member is compressed in the hole.

3. The cantilever tensioner as in claim 1, wherein a fastener center in the elastomeric member is displaced from a hole center.

4. The cantilever tensioner, as in claim 1, wherein the elastomeric member comprises a Shore A durometer in the range of approximately 60 to 81.

* * * * *